US005971221A

United States Patent [19]

Schwarz

[11] Patent Number: 5,971,221

[45] Date of Patent: Oct. 26, 1999

[54] COMBINATION VENTILATION UNIT AND SEAL FOR SPRAY HEADS OF SPRAY BOTTLES

[76] Inventor: Robert Schwarz, Rosskopfstr. 18, D-82031 Grünwald, Germany

[21] Appl. No.: 08/942,202

[22] Filed: Oct. 1, 1997

[30] Foreign Application Priority Data

Oct. 1, 1996 [DE] Germany ........................... 196 42 073

[51] Int. Cl.$^{6}$ .............................. B67D 5/58; B01D 53/22

[52] U.S. Cl. .............................................. 222/189.09; 96/4

[58] Field of Search .............................. 222/189.09, 482, 222/481.5; 96/4, 11, 12, 13

[56] References Cited

U.S. PATENT DOCUMENTS

| | | | |
|---|---|---|---|
| 3,630,690 | 12/1971 | Coppola | 23/288 |
| 4,476,995 | 10/1984 | Bellino et al. | 220/371 |
| 4,865,630 | 9/1989 | Abe | 55/158 |
| 5,120,585 | 6/1992 | Sutter et al. | 428/34.2 |
| 5,154,325 | 10/1992 | Ryder et al. | 222/189.09 X |
| 5,499,743 | 3/1996 | Blumenkron | 222/482 X |
| 5,542,670 | 8/1996 | Morano | 222/482 X |
| 5,856,246 | 1/1999 | Witzko | 442/88 |

FOREIGN PATENT DOCUMENTS

| | | |
|---|---|---|
| 0 246 075 | 11/1987 | European Pat. Off. . |
| 0 500 249 A1 | 8/1992 | European Pat. Off. . |

*Primary Examiner*—Andres Kashnikow
*Assistant Examiner*—Sean P. O'Hanlon
*Attorney, Agent, or Firm*—Carol A. Lewis White

[57] ABSTRACT

The invention concerns a closing device (1) for the removal of solid and/or liquid substances from housings, containers, bottles, or the like, which can be filled with a liquid or solid material, consisting of an air intake element (7), which in a manner allowing detachment closes an auxiliary opening of the housing, container, bottle, or the like, and a suction pipe connection (2) and/or a suction pipe (6), which traverse(s) this air intake element (7), whereby the air intake element (7) includes a pressure equalizing device having at least one membrane (5) made of a material which is impervious to liquids and/or solids but permeable by gases, and that the suction pipe connection (2) or suction pipe (6) is joined at its exterior wall to the air intake element (7) as a tight seal against gas and/or liquid.

25 Claims, 5 Drawing Sheets

COMBINATION VENTILATION UNIT AND SEAL FOR SPRAY HEADS OF SPRAY BOTTLES

FIELD OF THE INVENTION

The invention concerns a sealing and ventilation device for housings, containers, bottles, or the like, which can be filled with a liquid or solid material.

BACKGROUND OF THE INVENTION

In the case of containers from which substances are removed, such as for example, by a spray gun, the problem arises that the decrease in volume inside the container must be equalized by a stream of incoming air. To that end, the container must be opened at another place or must be equipped with an air intake valve. It is also possible for the closing device or spray gun to be equipped, for example, with an additional air intake pipe.

Considerable drawbacks are associated with these devices. Thus, in the case of containers bearing an additional opening, steps must be taken to seal it off during or after use. Air intake valves have the drawback that an additional and costly construction component must be used. It is possible for air intake pipes to clog during use, especially when utilization is interrupted, and thereafter they cannot be employed any more for further use.

The task of the present invention is, therefore, to create a closing device which overcomes the drawbacks inherent in the state of the art. In particular, the object is to create a closing device simple in design which consists of only a few components and can be easily assembled.

This and other purposes of the present invention will become apparent based on the teachings herein.

SUMMARY OF THE INVENTION

The present invention is a closing device which provides both sealing and ventilation for containers, bottles, and the like, which can be filled with a liquid or a solid. The novel closing device comprises (1) an air intake, or ventilation element which, in a manner allowing detachment, closes an auxiliary opening in the housing, container, bottle, or the like, and (2) at least one of a suction pipe and a suction pipe connection/suction pipe assembly, which traverse(s) this air intake, or ventilation element, characterized by the fact that the air intake element includes a pressure equalizing device having at least one membrane made of a material impervious, or impermeable to liquids and/or solids but permeable to gases, and that the suction pipe connection assembly or suction pipe is joined at its exterior wall to the air intake element as a tight seal against solids or liquids.

Thus, the air intake element consists of a membrane, which in certain cases may be laminated onto a carrier material. The membrane itself, and where applicable in connection with a carrier material, forms a seal or a sealing liner which is, due to the properties of the membrane and carrier material, gas permeable but not permeable to liquids and solids. The result achieved in this manner is that the closing device serves the dual purpose of acting as a seal for the substance to be removed, and also serves for air intake and exhaust and thus, ventilation, of the container from which the substances are being removed.

The closing device according to the invention thus has the advantage of simplicity of design, eliminating the need for additional seals in the vicinity of the closing device and additional air intake measures or devices for the container to be emptied.

The membrane of the pressure equalizing device can be implemented in such a manner that this membrane together with the optional carrier material(s) which may be present in certain cases, forms the air intake element per se. In that case, the surface of the membrane and, where applicable, the surface of the carrier material act as a seal for the devices to be put atop or joined to the container from which substances are to be removed for the purpose of removing, delivering, or transporting the substances found in the container. This eliminates the need for further components in the closing device according to the invention. This can be particularly advantageous when dealing with especially hazardous substances.

The membrane together with, where applicable, the carrier material can in a simple manner be adapted in shape to the surface to be sealed. To that end, the membrane can be in some cases substantially even, or flat, or in other cases bent or curved, or even, in further optional cases, vaulted.

The membrane preferably consists of a material which, in relation to the media with which it comes into contact, is inert and/or durable. Preferably the material is selected from a group of the following sintered or unsintered materials: polypropylene, polyester, polyamide, polyether, polytetrafluoroethylene (PTFE), polysulfone, ethylene tetrafluoroethylene copolymer (e.g. TEFZEL®), fluorinated ethylene propylene (FEP) and tetrafluoroethylene-perfluoro (propylvinyl) ether copolymer (PFA).

Preferably the membrane consists of an oriented microporous polytetrafluoroethylene (PTFE).

In any case, suitable membranes typically have a thickness in the range between 1 and 2000 micrometers, preferably a thickness in the range between 1 and 100 micrometers.

Moreover, the membrane can preferably be filled or coated with an absorbent material or a catalyst.

Furthermore, the membrane according to the invention can be laminated. Preferably the membrane is laminated onto at least one layer consisting of a carrier material. This carrier layer can, in turn, contain any desirable material such as an absorbent material or a catalyst. In certain cases the carrier layer may contain such materials in addition to an absorbent material or catalyst contained in the membrane.

The carrier material for laminating comprises a felt, a woven, a knit, a perforated plate, or a grid. A perforated plate is preferred, in which the holes have ventilation channels. The arrangement of ventilation channels on the carrier material can be executed in various ways. Especially preferred are carrier materials in which the ventilation channels are present only on a partial section or segment of the carrier material. The number and configuration of the ventilation channels depends on the nature of the substance to be removed from the container and the delivery rate and volume.

The carrier material may be selected from the group containing the following sintered or unsintered materials: polypropylene, polyester, polyamide, polyether, polytetrafluoroethylene (PTFE), polysulfone, ethylene tetrafluoroethylene copolymer (e.g. TEFZEL®), fluorinated ethylene propylene (FEP), and tetrafluoroethylene-/perfluoro (propylvinyl) ether copolymer (PFA), uncoated metal, or coated metal.

Furthermore, if desired, the carrier material can be applied to the membrane on one or both sides, or the membrane can be applied to the carrier material on one or both sides. Depending on the surfaces to be sealed off in relation to each other, the materials of the carrier layers and/or the membranes, when at least two of them are present, can be made of different materials.

Furthermore, depending on the particular special application, it is advantageous for the membrane to be oleophobic. Preferably, an oleophobic membrane has an oil repelling degree greater than or equal to 4, especially preferred is an oil repelling degree greater than or equal to 8. The oil repelling degree is determined according to the AATCC testing method 118-1989 ASTM.

The air intake element consists preferably of the membrane and a laminated carrier material. The membrane can, together with the laminated carrier material where applicable, be a component of an air intake element comprising additional elements, depending on the area of application. Additional elements can be, for example, adapter rings, thread reductions, and/or support or carrying plates, etc.

The air intake element is preferably circular in shape. Where necessary, the air intake element may desirably have another shape adapted to fit the bottle opening.

In order to transport the substances out of the bottles, it is necessary according to the invention to provide a suction pipe connection. This suction pipe connection traverses the air intake element. It is possible for this suction pipe connection to be elongated in form in such a way as to be usable itself as a suction pipe. In addition to the suction pipe connection, a suction pipe can be present, which is mounted in the suction pipe connection or inserted through the suction pipe connection and held therein in such a manner that it is possible to slide it.

The suction pipe or suction pipe connection, as the case may be, is preferably positioned concentrically in the air intake element. If necessary, the suction pipe or suction pipe connection can also be positioned non-concentrically.

The suction pipe or suction pipe connection preferably has a cylindrical cross-section. However, where necessary, the cross-section of the pipe may also have another shape, for example oval.

In another embodiment of the closing device according to the invention, instead of a suction pipe connection, only a suction pipe is used, which traverses the air intake element.

This suction pipe is sealed off from the air intake element in a different way. For one thing, a suction pipe seal sprayed onto the air intake element can be provided to seal the suction pipe. This suction pipe seal is executed in such a manner that the suction pipe is positioned in the seal in a manner allowing it to slide, but at the same time in a manner such that it is pinched by the suction pipe seal so that a connection representing a tight seal against gases and liquids is formed.

In another embodiment, the suction pipe together with the air intake element is sprayed on with formation of a liner seal.

Manufacturing of the closing device according to the invention involves using injection molding technology to spray a suction pipe connection, a suction pipe seal, or a suction pipe with formation of a liner seal onto the air intake element. Suitable plastics used in injection molding technology are known to those skilled in the art. Likewise, known in the art are injection molding technology methods, especially the two component injection molding process.

For spraying on the suction pipe connection or the suction pipe or liner seal, one uses according to the invention plastics which are inert or durable in relation to the utilized media. Particularly well-suited are hard thermoplastic materials from the group including polyethylene terephtalate (PBTP), polyoxymethylene (POM), polyethylene (PE), ULTRADUR®, DELRIU®, ULTRAMED®, reinforced plastics, especially plastics reinforced or filled with fiber glass; and if in addition a soft thermoplastic material is utilized as a second material component, selected from the group which includes: thermoplastic elastomers (TPE), especially SANTOPRENE®, ALCRYN®, HYTREL®, GEOLAST®, AND THERMOLAST K®.

These and other purposes of the present invention will become evident from review of the following specification.

DESCRIPTION OF THE DRAWINGS

The operation of the present invention should become apparent from the following description when considered in conjunction with the accompanying drawings, in which.

DETAILED DESCRIPTION OF THE INVENTION

Figure 1:
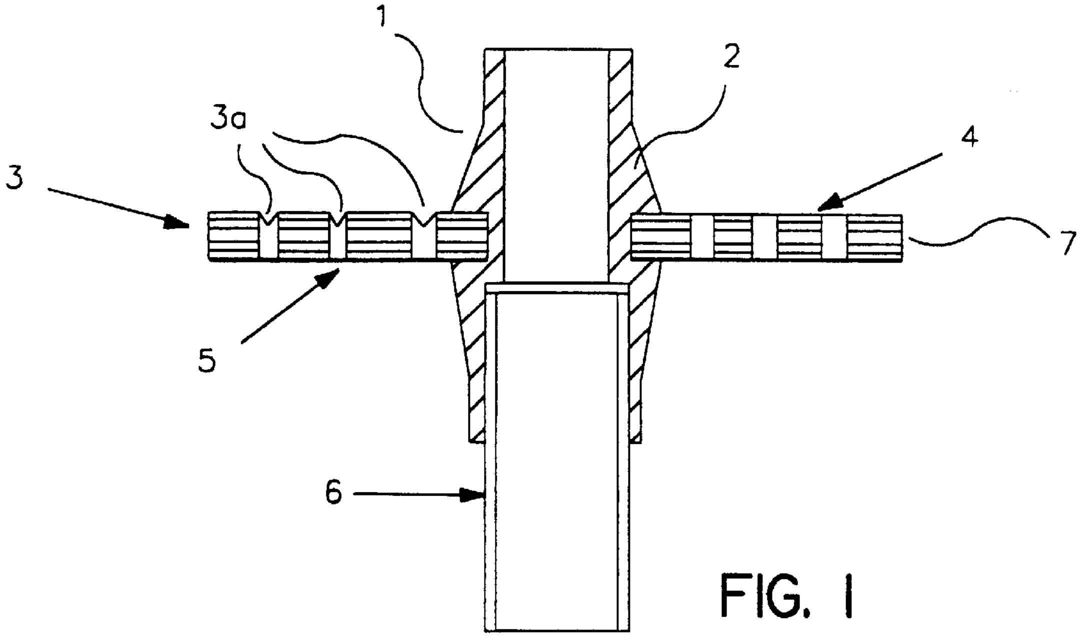
FIG. 1 is a drawing showing the cross-section of a first embodiment form of the closing device.
Figure 2:
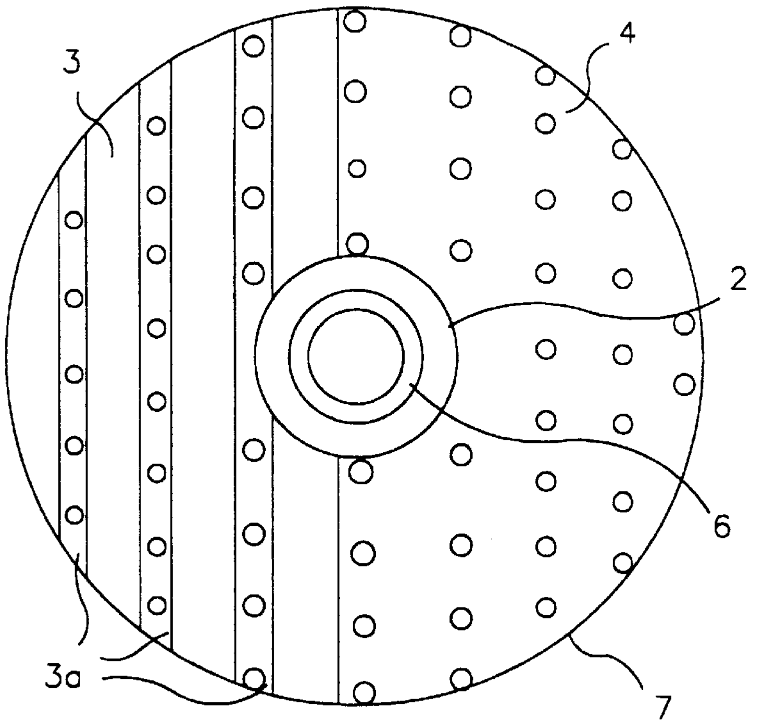
FIG. 2 is a top view of the embodiment shown in FIG. 1.

FIGS. 1 and 2 concern a first example of an embodiment of the closing device 1 according to the present invention. The closing device 1 comprises an air intake element 7 and a suction pipe connection 2, which is securely joined to the air intake element 7. The joining is such that this connection is impermeable to both solids and liquids. The air intake element takes the form of a sealing liner, which is preferably equipped with ventilation channels 3*a*. This sealing liner forms the entire air intake element 7. Thus, the air intake element 7 consists of a membrane 5, onto which a carrier material is laminated. The carrier material has perforations or takes the form of a perforated plate. FIGS. 2, 4, 7 and 10 each show two embodiments of the carrier layer 3. A first embodiment of the invention is shown on the left-hand side of each figure and a second embodiment is shown of the right-hand side of each figure. Each embodiment can be used depending on the nature of the substance to be removed from the container, the delivery rate and the volume. The left-hand side of the carrier material 3 shows the first embodiment which takes the form of a perforated plate with ventilation channels 3*a*, while the right-hand side of the carrier material 3 shows the second embodiment which takes only the form of a perforated plate 4. The ventilation channels 3*a* are executed in such a manner that the surface of the carrier material along the rows of holes of the air intake element 7 is excluded. The suction pipe connection 2 is sprayed onto the air intake element 7. The suction pipe connection 2 is one with the inner bore of the air intake element 7. The suction pipe connection 2 is executed as a pipe and serves to receive and/or guide the suction pipe 6.

Figure 3:
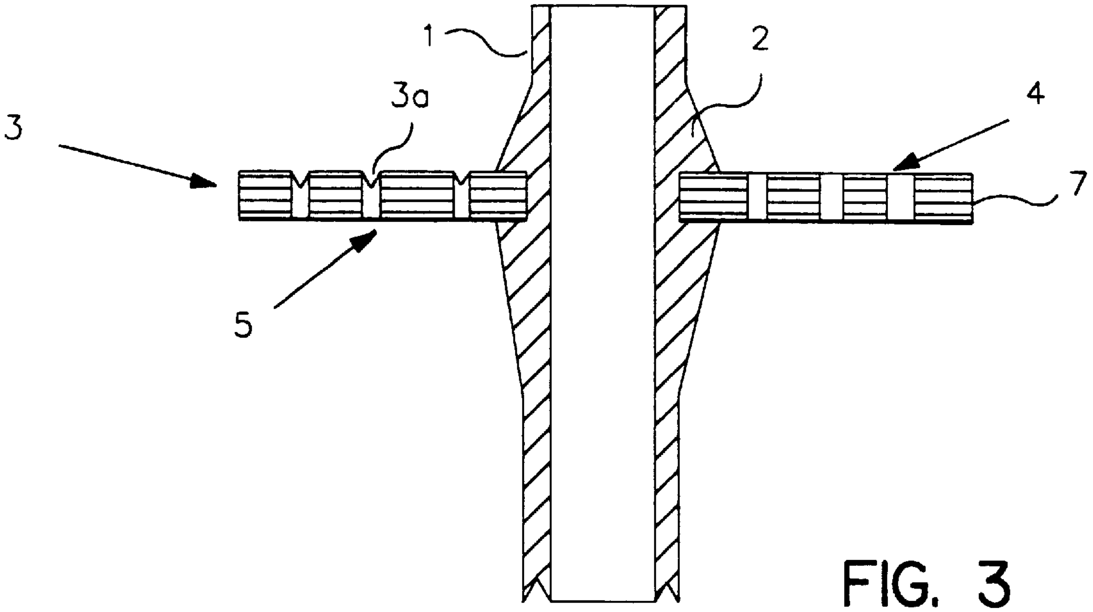
FIG. 3 is a drawing showing the cross-section of a second embodiment form of the closing device.
Figure 4:
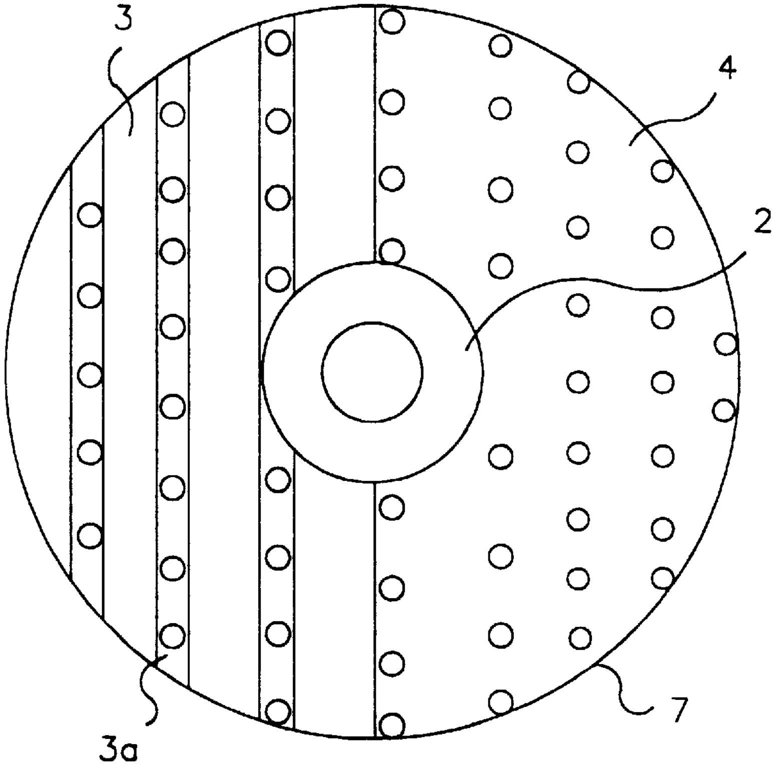
FIG. 4 is a top view of the embodiment shown in FIG. 3.

In FIGS. 3 and 4, a second example of an embodiment of the closing device according to the invention is shown. Unlike the first embodiment form, the suction pipe connection 2 is elongated on one side in such a manner that the latter itself forms the suction pipe. According to this example of an embodiment, the need for the suction pipe 6 itself is eliminated.

Figure 5:
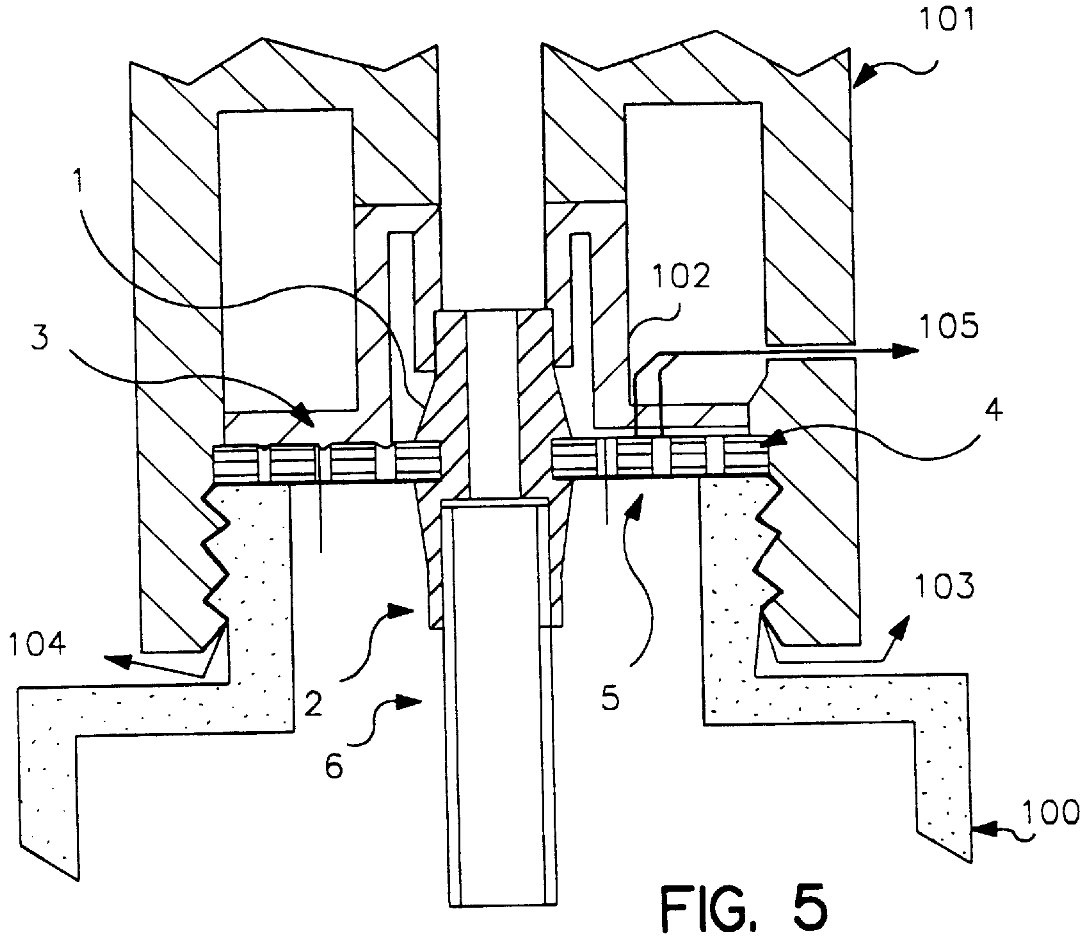
FIG. 5 is a drawing showing a cross-section of the closing device according to FIG. 1 ready to operate inside a spraying device.

In FIG. 5, a closing device 1 according to FIG. 1 is shown, whereby the closing device 1 according to the invention is shown in its utilization in a conventional spray gun. The closing device 1 is placed atop the edge of the opening of a bottle 100. The neck of the bottle is threaded on the outside. A screw cap 101 of a conventional spray gun is screwed onto this external threading, whereby the pressure plate 102 of the screw cap 101 rests above on top of the sealing liner and presses the latter against the upper side of the bottleneck. Air intake path 103 into the bottle is created via the threading of the bottleneck and screw cap 101. In addition to the air intake path 103, it is possible if so desired to choose to provide for air intake paths 104 and/or 105. Air intake 103 leads to the outside via the holes in the sealing liner (carrier layer) and via the threading on the screw cap. In the case of air intake 104, air is taken in via the holes in the carrier layer and the ventilation channels 3*a* in the surface of the carrier material and via the threading in the screw cap leading to the outside. Air intake 105 leads via the holes and the ventilation channels 3*a*, or only via the holes, of the carrier material through appropriately executed air intake bore holes in the screw cap 101 and the pressure plate 102 leading to the outside. Thus, at least three different paths for taking in air are available and can be selected depending on the area of application.

Figure 6:
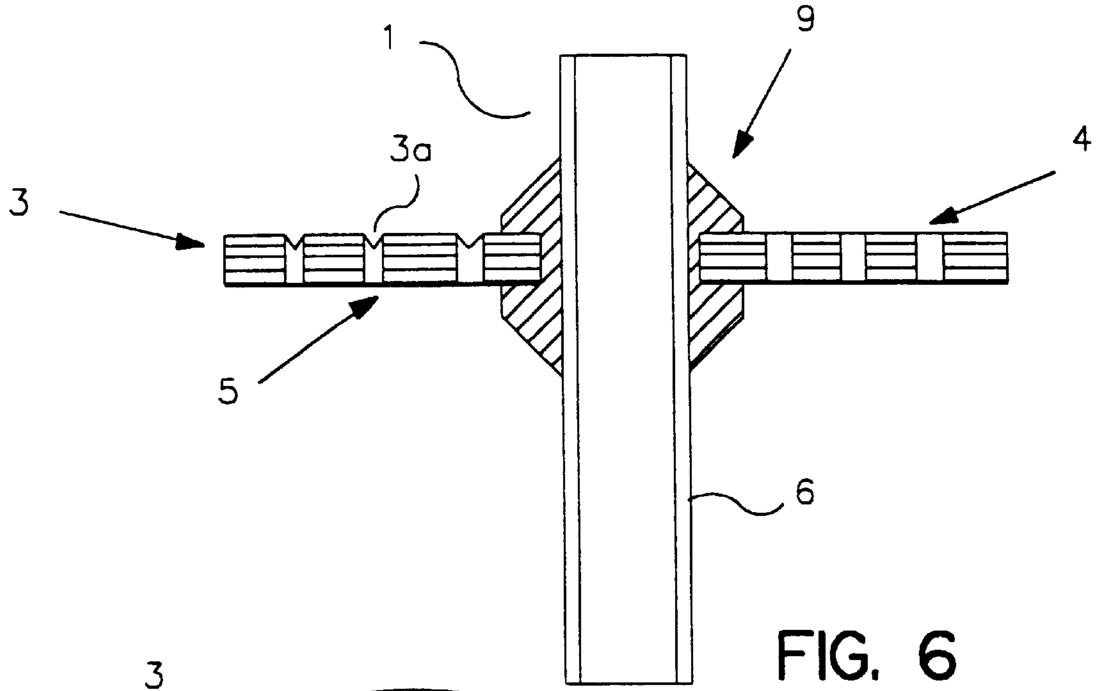
FIG. 6 is a drawing showing a cross-section of a third embodiment form of the closing device.
Figure 7:
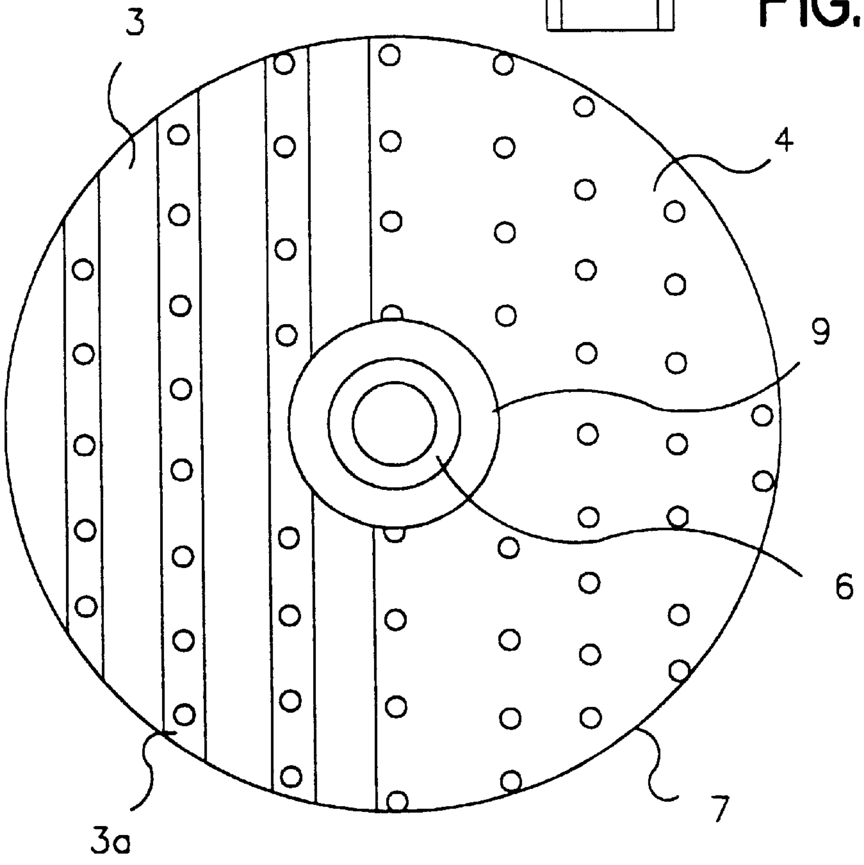
FIG. 7 is a top view of the embodiment shown in FIG. 6.

In FIGS. 6 and 7, a third example of an embodiment of the closing device 1 according to the invention is shown. In FIG. 7 a suction pipe 6 is shown, which is securely connected to the air intake element 7 by means of the liner seal 9. To that end, the suction pipe 6 is injection molded together with the air intake element 7 with formation of the liner seal 9. The suction pipe 6 is securely located inside the liner seal 9. The exterior wall of the suction pipe 6 is integrally joined with the interior bore of the air intake element 7 by means of the sprayed on liner seal 9.

Figure 8:
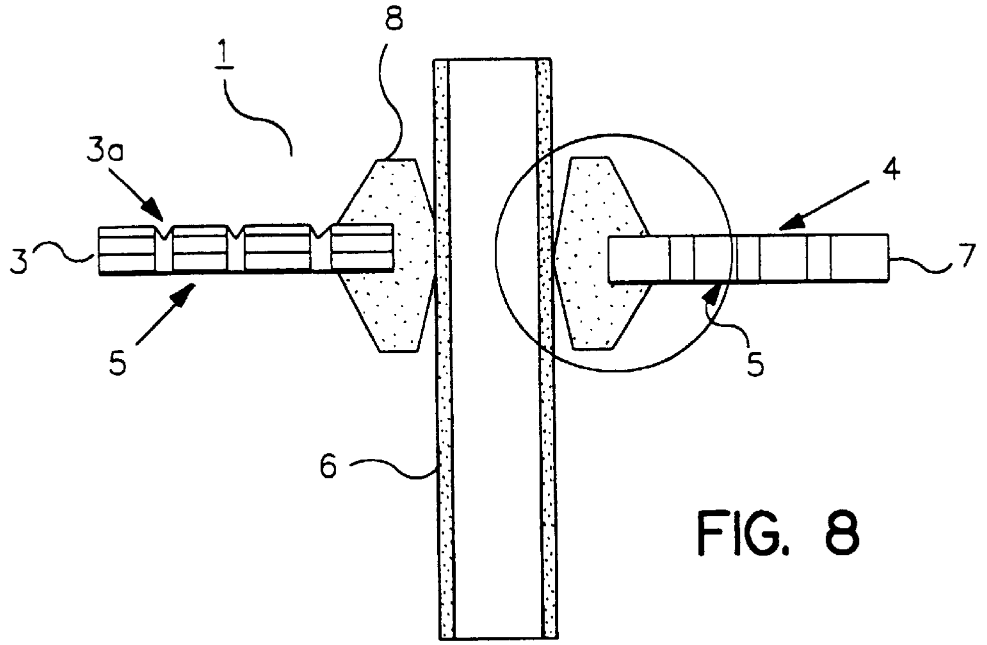
FIG. 8 is a drawing showing a cross-section of a fourth embodiment form of the closing device.
Figure 9:
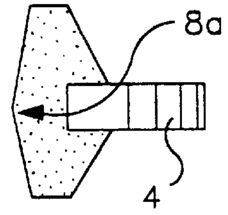
FIG. 9 is an enlarged detailed drawing of a section from FIG. 8.
Figure 10:
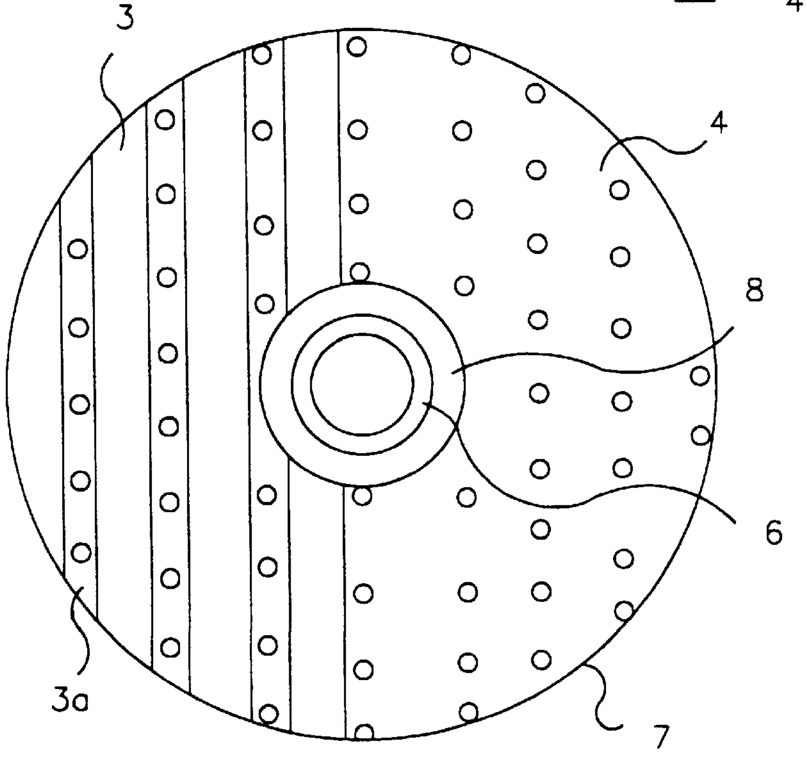
FIG. 10 is a top view of the embodiment shown in FIG. 8.

FIGS. 8, 9, and 10 show a fourth example of an embodiment of the closing device 1 according to the invention. The air intake element 7 has an additional suction pipe seal 8 for the suction pipe 6. Here the suction pipe seal 8 is sprayed onto the air intake element 7. In this example of an embodiment, only a suction pipe 6 is executed. The suction pipe seal 8 pinches with its sealing edge 8*a* the suction pipe 6 and thereby accomplishes the seal against gas and liquids between the air intake element 7 and the suction pipe 6. Using this type of seal it becomes possible for the suction pipe 6 to be able to slide inside the suction pipe seal 8.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A closing device for an auxiliary pressure equalization opening of a spray container which can be filled with a liquid or solid, the opening having an outer rim, comprising a ventilation element which, in a manner allowing for detachment, closes the auxiliary opening of the container, comprising at least one membrane having an upper and a lower surface made from a material that is impermeable to liquids and solids but permeable to gases, and at least one carrier material attached to the upper or lower surface of the membrane, whereby the ventilation element is in contact with the outer rim of the auxiliary pressure equalization opening; and at least one of a suction pipe and a suction pipe/suction pipe connection assembly having an exterior wall which traverses the ventilation element, and which is joined with the ventilation element as a tight seal against solids and liquids.

2. The closing device according to claim 1, wherein the membrane comprises a material selected from the group consisting of polypropylene, polyester, polyamide, polyether, polytetrafluoroethylene (PTFE), polysulfone, ethylene tetrafluoroethylene copolymer, fluorinated ethylene propylene (FEP) and tetrafluoroethylene-perfluoro (propylvinyl) ether copolymer (PFA).

3. The closing device according to claim 2, wherein the membrane is made of an oriented microporous polytetrafluoroethylene (PTFE).

4. The closing device according to claim 3, wherein the membrane has a thickness in the range from 1 to 2000 micrometers.

5. The closing device according to claim 4, wherein the membrane has a thickness in the range from 1 to 100 micrometers.

6. The closing device according to claim 2, wherein the membrane is oleophobic.

7. The closing device according to claim 6, wherein the membrane has an oil repelling degree greater than or equal to 4 according to the AATCC 118-1989ASTM test method.

8. The closing device of claim 7, wherein the membrane has an oil repelling degree greater than or equal to 8 according to the AATCC 118-1989ASTM test method.

9. The closing device according to claim 1, wherein the membrane has a thickness in the range from 1 to 2000 micrometers.

10. The closing device according to claim 9, wherein the membrane has a thickness in the range from 1 to 100 micrometers.

11. The closing device according to claim 1, wherein the membrane is filled or coated with at least one material selected from the group consisting of an absorbent material and a catalyst.

12. The closing device according to claim 1, wherein the membrane is laminated onto the at least one carrier material.

13. the closing device according to claim 12, wherein the carrier material comprises at least one material selected from the group consisting of a felt, a woven, a knit, a perforated plate and a grid.

14. The closing device according to claim 12, wherein the carrier material has ventilation channels.

15. The closing device according to claim 14, wherein the carrier material has ventilation channels in a portion of the material.

16. The closing device according to claim 12, wherein the carrier material comprises at least one material selected from a group consisting of polypropylene, polyester, polyamide, polyether, polytetrafluoroethylene (PTFE), polysulfone, ethylene tetrafluoroethylene copolymer, fluorinated ethylene propylene (FEP), tetrafluoroethylene-perfluoro (propylvinyl) ether copolymer (PFA), uncoated metal, and coated metal.

17. The closing device according to claim 12, wherein the membrane is sandwiched between two carrier materials.

18. The closing device according to claim 12, wherein the carrier material is sandwiched between two membranes.

19. The closing device according to claim 12, wherein the at least one layer of carrier material contains at least one of an absorbent material and a catalyst.

20. The closing device of claim 1, comprising a suction pipe/suction pipe connection assembly, wherein the suction pipe connection is sprayed onto the ventilation element and is integrally joined to it.

21. The closing device according to claim 20, wherein the suction pipe is inserted into the suction pipe connection.

22. The closing device according to claim 20, wherein the suction pipe is capable of sliding within the suction pipe connection.

23. The closing device according to claim 1, wherein a suction pipe is joined with the ventilation element in the absence of a suction pipe connection.

24. The closing device according to claim 23, wherein the ventilation element further comprises a bore hole, and further wherein on the interior of the bore hole of the ventilation element a suction pipe seal is sprayed on, in which the suction pipe is positioned so as to form a tight seal and be capable of sliding.

25. The closing device according to claim 24, wherein the suction pipe together with a suction pipe seal is sprayed on inside the bore hole of the ventilation element.

* * * * *